United States Patent
Nagata et al.

(10) Patent No.: US 7,426,777 B2
(45) Date of Patent: Sep. 23, 2008

(54) METHOD OF PRODUCING MEMBER HAVING FACE-GEARED SURFACE

(75) Inventors: Eiri Nagata, Toyoake (JP); Hidehiro Yoshino, Saga (JP); Fumihiro Oshima, Saga (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/687,849

(22) Filed: Mar. 19, 2007

(65) Prior Publication Data

US 2007/0214643 A1 Sep. 20, 2007

(30) Foreign Application Priority Data

Mar. 20, 2006 (JP) .............................. 2006-077024

(51) Int. Cl.
*B23F 5/24* (2006.01)
*B23P 15/14* (2006.01)

(52) U.S. Cl. .................. 29/33 R; 29/893.35; 29/893.3; 409/25; 409/33; 409/45; 409/23; 451/47; 451/219; 451/235

(58) Field of Classification Search ................. 29/33 R, 29/50, 893.3, 893.35, 893.36, 893; 409/11, 409/12, 13, 25, 26, 27, 28, 29, 30, 31, 33, 409/37, 38, 43, 49, 50, 51; 451/47, 56, 177, 451/178, 219, 232, 253, 275, 72; 407/28
See application file for complete search history.

(56) References Cited

U.S. PATENT DOCUMENTS 3,213,756 A * 10/1965 Ash, II ........................ 409/30
4,930,950 A * 6/1990 Stadtfeld ....................... 409/27
4,981,402 A * 1/1991 Krenzer et al. ................. 409/26
5,116,173 A * 5/1992 Goldrich ....................... 409/13
5,139,005 A * 8/1992 Dodd ........................... 451/72
5,800,103 A * 9/1998 Stadtfeld et al. .............. 409/27
5,961,260 A * 10/1999 Kasler et al. .................. 409/25
6,120,355 A * 9/2000 Stadtfeld et al. .............. 451/47
6,146,253 A * 11/2000 Litvin et al. .................. 451/47
6,390,894 B1  5/2002 Beel et al.
6,669,415 B2 * 12/2003 Stadtfeld et al. .............. 409/27
6,712,566 B2 * 3/2004 Stadtfeld et al. .............. 409/26
6,842,954 B2 * 1/2005 Ronneberger .................. 29/50

FOREIGN PATENT DOCUMENTS

GB  2 162 454 A  2/1986
NL  9400166  9/1995

OTHER PUBLICATIONS

Machines & Tools, Jul. 1998, pp. 15-20.

* cited by examiner

*Primary Examiner*—Dana Ross
(74) *Attorney, Agent, or Firm*—Oblon, Spivak, McClelland, Maier & Neustadt, P.C.

(57) ABSTRACT

A method of producing a member with a face-geared surface. An example of the method includes an initial process preparing a work piece and a hob, and a geared surface forming process forming a geared surface on a part of the area. In addition, at least one of the hob and the work piece is retracted in the radial direction of the hob. Further, the geared surface forming process and the retracting process are repeated to produce a full face-geared surface on the work piece.

7 Claims, 10 Drawing Sheets

(0°)

(30°)

(150°)

(180°)

(360°)

F I G. 5
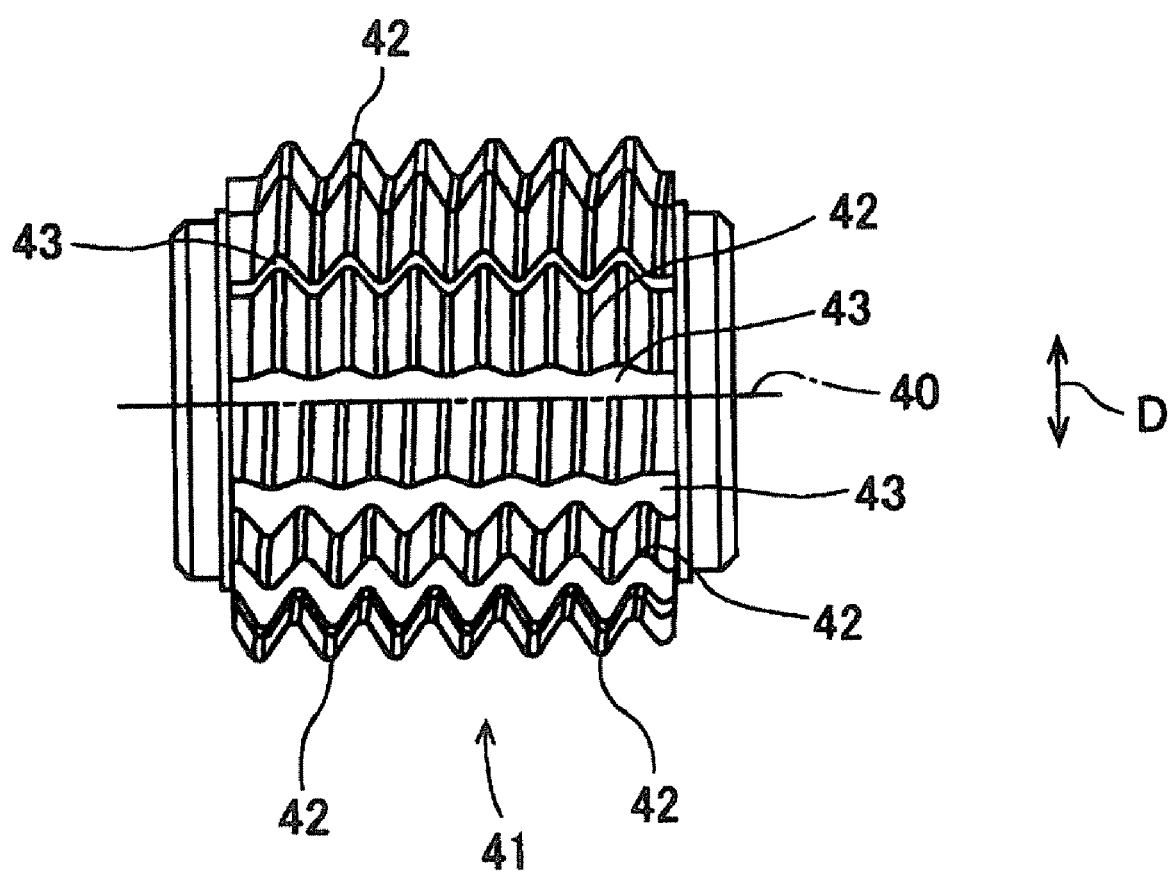

Spiral bevel gear

Pinion
Pitch line

Face gear

Pinion
Pitch line

METHOD OF PRODUCING MEMBER HAVING FACE-GEARED SURFACE

CROSS REFERENCE TO RELATED APPLICATIONS

This application is based on and claims priority under 35 U.S.C. § 119 to Japanese Patent Application 2006-077024 filed on Mar. 20, 2006, the entire content of which is incorporated herein by reference.

FIELD OF THE INVENTION

The present invention relates to a method for manufacturing a member having a face-geared surface, for example a face gear, an electrode for a process or the like.

BACKGROUND

FIG. 11A and FIG. 11B each illustrates a spiral bevel gear meshing with a pinion. FIG. 12A and FIG. 12B each illustrates a face gear meshing with a pinion. The spiral bevel gear rolling contacts with the pinion on every portion on a pitch line thereof. The face gear, rolling contacts with the pinion only at a point at which a segment of a line equivalent to the pitch line of the spiral bevel gear is crossed. In recent years, attention has been paid to the face gear, since, in comparison with the spiral bevel gear, it is advantageous in terms of cost efficiency.

Methods for gear cutting of such a face gear include a plunge cut method and a tangential feed method ("Machines and Tools", July issue, 1998, pages 16 to 20). According to the plunge cut method, in a state in which a cutter faces a work piece, the cutter is disposed in a direction in which a shaft axis of the cutter and that of the work piece cross each other; while the cutter and the work piece are rotated at the same time, the cutter is fed toward the work piece; and then, gear cutting is performed on the work piece. According to the tangential feed method, in a state in which a cutter does not face a work piece at an initial position, the cutter is disposed in a direction in which a shaft axis of the cutter and that of the work piece cross each other; while the cutter and the work piece are rotated at the same time, the cutter is fed while being reciprocally moved along a radial direction of the work piece; and then, gear cutting is performed on the work piece.

According to the methods described above, although a face gear is formed, the level of efficiency in forming a face-geared surface are not always sufficient. In the related industrial field, a demand exists for developing a method for forming a face-geared surface efficiently.

A need thus exists to provide a manufacturing method by which a face-geared surface is formed efficiently.

SUMMARY OF THE INVENTION

According to an aspect of the present invention, a method of producing a member having a face-geared surface includes steps of: (a) an initial operation preparing a work piece and a hob, the work piece having a partial area on which a face-geared surface is formed, the hob having a cutting blade, the hob being brought into an axial movement when rotated by an angle of 360 degrees about its longitudinal axis, the initial operation bringing the work piece to face the hob with a distance; (b) a face-geared surface forming operation forming the face-geared surface on the partial area of the work piece by rotating the hob about its longitudinal axis in one direction by an angle of less than 360 degrees after establishing of a mutual engagement between the hob and the work piece, which results from moving at least one of the hob and the work piece in a radial direction of the hob; and (c) a retracting operation retracting the at least one of the hob and the work piece in the radial direction of the hob to establish a separation of the hob from the work piece before the hob completes its 360 degree rotation about its longitudinal axis, the retracting operation retracting the hob in its longitudinal direction through a distance which is equal to an axial movement amount of the hob resulting from rotating the hob; wherein the face-geared surface forming operation and the retracting operation are repeated in order to form a full face-geared surface on the partial area of the work piece.

BRIEF DESCRIPTION OF THE DRAWINGS

The foregoing and additional features and characteristics of the present invention will become more apparent from the following detailed description considered with reference to the accompanying drawings, wherein:

FIG. 5 illustrates a front view of the hob;

DETAILED DESCRIPTION

Figure 1:
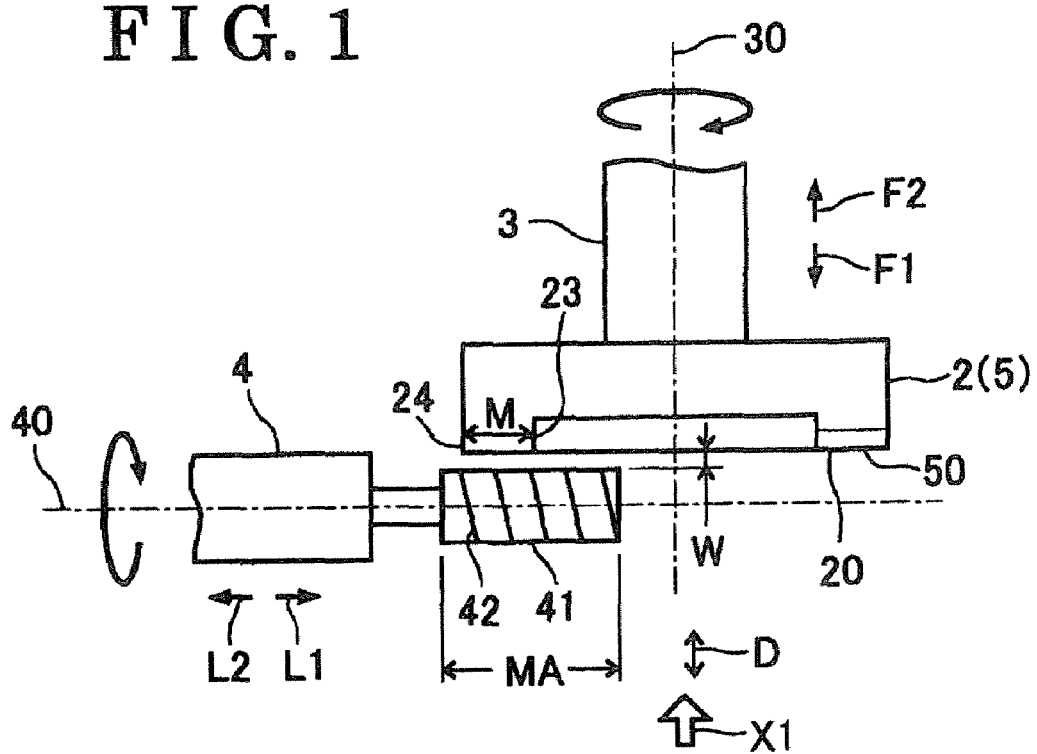
FIG. 1 illustrates a front view indicating states of a work piece and a hob immediately before a process is applied to the work piece by the hob.

According to the method of the present invention, a hob having a cutting blade and a work piece are prepared, and then, an initial operation is made so as to establish a state in which the hob and the work piece are positioned away from each other and face each other. In the initial operation, it is preferable that the work piece, and its shaft axis, and the hob, and its shaft axis, are positioned so as to form 90 degrees. It is preferable that the cutting blade of the hob is formed in a worm shape (in a helical screw shape). However, it should be noted that the hob has a vertical groove that crosses the cutting blade.

After the initial operation, an operation of forming a face-geared surface is performed. In the face-geared surface forming operation, while the hob is rotated in one direction around its shaft axis, at least one of the hob and the work piece is advanced in a radial direction of the hob so that the hob and the work piece are pressed against each other. In this manner, during a period of one rotation around the shaft axis of the hob, a face-geared surface forming operation is completed in such a way that, within a degree of rotation of the hob of less than one rotation, a face-geared surface is formed on the work piece. In the face-geared surface forming operation, it is preferable that the work piece is in a non-rotating state.

A retracting operation is performed after the face-geared surface forming operation. During the retracting operation, in the course of one rotation around the shaft axis of the hob, within the remaining degree of rotation of the hob, at least one of the hob or the work piece is retracted in the radial direction of the hob so that the hob and the work piece are positioned away from each other. In addition, in order to compensate for the movement in an axial direction of the hob that had occurred by the rotation of the hob during the face-geared surface forming operation, the hob is moved, for example outwardly, along a direction of the shaft axis of the hob. Further, in the retracting operation, it is preferable to feed the work piece so as to moved around the shaft axis of the work piece within a predetermined degree. In this manner, an area for the next gear-cut operation can be constantly faces the hob.

The face-geared surface forming operation and the retracting operation, described above, are repeatedly performed, and eventually, a face-geared surface is formed on the work piece. The face-geared surface may preferably be a helical gear.

Members having a face-geared surface include a gear member having a face-geared surface (a face gear per se) or an electrode having a face-geared surface.

Electrical discharge machining, or electrochemical machining, is performed by use of an electrode formed in the aforementioned manner, whereby the face-geared surface of the electrode can be transferred on a die member. In this manner, a molding die is formed which has a face-geared surface formed by transferred the electrode face-geared surface thereon. Examples of the molding die are a resin molding for molding a resin molding article, a power pressurization molding for a molding powder before a process of sintering; and a molding for forging so as to mold a cast product.

First Embodiment

Hereinafter, a first embodiment of the present invention will be described with reference to FIG. 1 to FIG. 5. The present embodiment is provided as an example of forming a face gear 5 by means of the hob 41. In order to implement a forming method of continuous gear cutting of the face gear 5, it is preferable to take into consideration the following factors.

(1) It is preferable to obtain a relative movement, which is adequate for gear cutting and machining for a work piece 2, between a cutting blade 42 of the hob 41 and the work piece 2.

(2) Among the cutting blades 42 of the hobs 41, it is preferable to ensure that the cutting blades 42 used as many as possible.

(3) It is preferable to utilize or shorten an idling time of the hob 41, in other words, to utilize or shorten a non-cutting time of the hob 41.

In order to achieve these factors, according to the present embodiment, a regular hob 41 is employed. In addition, a forming method of continuous gear cutting is provided for controlling advancing of a hob shaft head 4 (the direction indicated by arrow L1 in an inward direction of the work piece radial direction); retracting of the hob shaft head 4 (the direction indicated by arrow L2 in an outward direction of the work piece radial direction);the rotation of the hob shaft head 4 around a hob shaft axis 40 (longitudinal axis); advancing of a work piece shaft head 3 (the direction indicated by arrow F1), retracting of the work piece shaft head 3 (the direction indicated by arrow F2); and rotation of the work piece 2 around a work piece shaft axis 30 (longitudinal axis). Thus the face gear 5 is formed efficiently without rotating the hob 41 in a reverse direction of a gear cutting direction, while the hob 41 is being rotated around the hob shaft axis 40 in the gear cutting direction.

Figure 2:
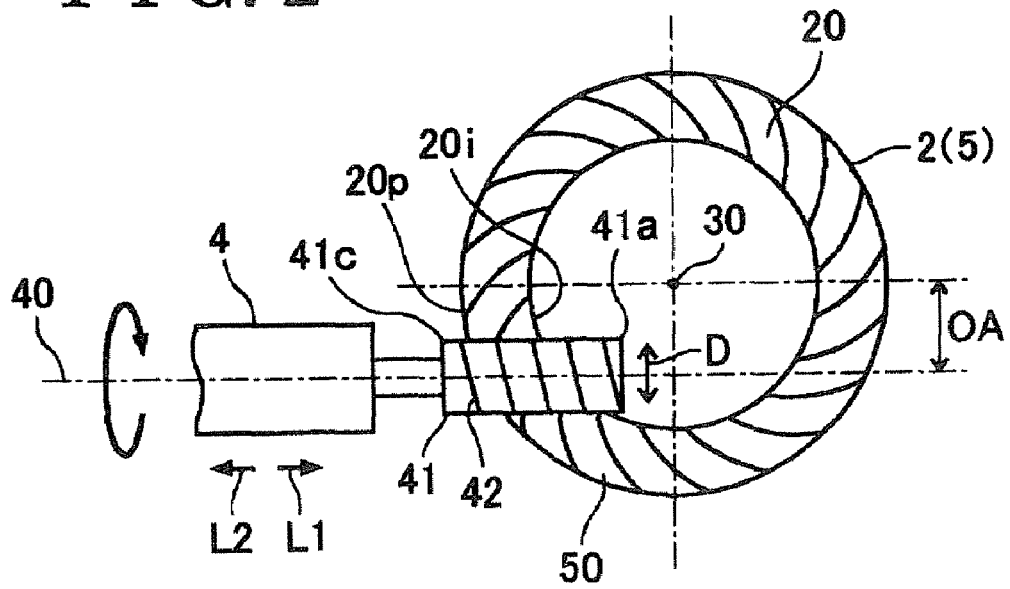
FIG. 2 illustrates a front view indicating states of the work piece and the hob immediately before a process is applied to the work piece by the hob.

FIG. 1 and FIG. 2 schematically illustrate an apparatus for conducting the method of the present invention. The apparatus is a face gear cutting machine of simultaneous four-shaft control, or a hobbing machine having similar functions. This apparatus is equipped with the work piece shaft head 3 for rotating the work piece 2 around the work piece shaft axis 30; and the hob shaft head 4 for rotating the hob 41 around the hob shaft axis 40. The hob 41 used in an aspect of FIG. 1 is a right torsion hob.

In other words, the work piece shaft head 3 has a function of rotating the work piece 2 around the work piece shaft axis 30 and a function of advancing and retracting the work piece 2 in a direction along the work piece shaft axis 30 (the direction indicated by the arrow F1 or the arrow F2). The hob shaft head 4 has a function of rotating the hob 41 around the hob shaft axis 40 and a function of advancing and retracting the hob 41 in a direction along the hob shaft axis 40 (the direction indicated by the arrow L1 and the arrow L2). As shown in FIG. 1 and FIG. 2, the hob shaft axis 40 exists on a horizontal face. The work piece shaft axis 30 and the hob shaft axis 40 both exist on a horizontal face, and they cross each other at a predetermined angle $\theta$ ($\theta$=90 degrees).

A material that is capable of cutting (for example, an iron-based metal, a copper-based metal, a carbon material such as graphite, or a resin material) is used as a base material for the work piece 2. The work piece 2 has a ring-shaped gear cutting area 20 that completes one circumference of the work piece shaft axis 30. The work piece 2 is gear cut, and then, serves as the face gear 5. A distance from an internal end to an external end in a tooth-widthwise direction of a gear cutting area 20 of the work piece 2, serving as the face gear 5, is defined as M (refer to FIG. 1). Therefore, the distance M is equivalent to a distance from an internal end 23 to an external end 24 in a tooth-widthwise direction of the gear cutting area 20 of the face gear 5 that is formed at the work piece 2.

The hob 41 serves as a gear-cutting tool, and is formed in a cylindrical shape. As shown in FIG. 5, the hob 41 forms a warm-shaped cutting blade 42 (in a helical screw shape) on the outer periphery of the cylinder. The cutting blade 42 is wound around the hob shaft axis 40. A vertical groove 43 is formed along an axially lengthwise direction of the hob 41. A helix angle of the cutting blade 42 of the hob 41 is equal to that of a gear part of a pinion that serves as a counterpart gear meshing with that of the face gear 5 manufactured according to the method of the present embodiment.

Such the hob 41 is a generally used hob. When the hob 41 makes one rotation of the hob shaft axis, the hob 41 advances by one pitch. The direction indicated by the arrow D represents a radial direction of the hob 41.

In this context, a full length MA of the hob 41 (refer to FIG. 1) includes the dimensional distance M from an internal end 23 to an external end 24 of a tooth width of the face gear 5. In addition, because the cutting blade 42 of the hob 41 is made to perform a screw movement, the full length MA further includes a distance that is substantially equivalent to one lead of the hob 41. Further, when an offset exists between the hob shaft axis 40 and the work piece shaft axis 30, the entire length MA of the hob 41 is defined taking into account the offset OA between the hob shaft axis 40 and the work piece shaft axis 30 (refer to FIG. 2). When no offset exists between the hob shaft axis 40 and the work piece shaft axis 30, with regard to the entire length MA of the hob 41, there is no need to consider any amount of offset OA between the hob shaft axis 40 and the work piece shaft axis 30.

Figure 3:
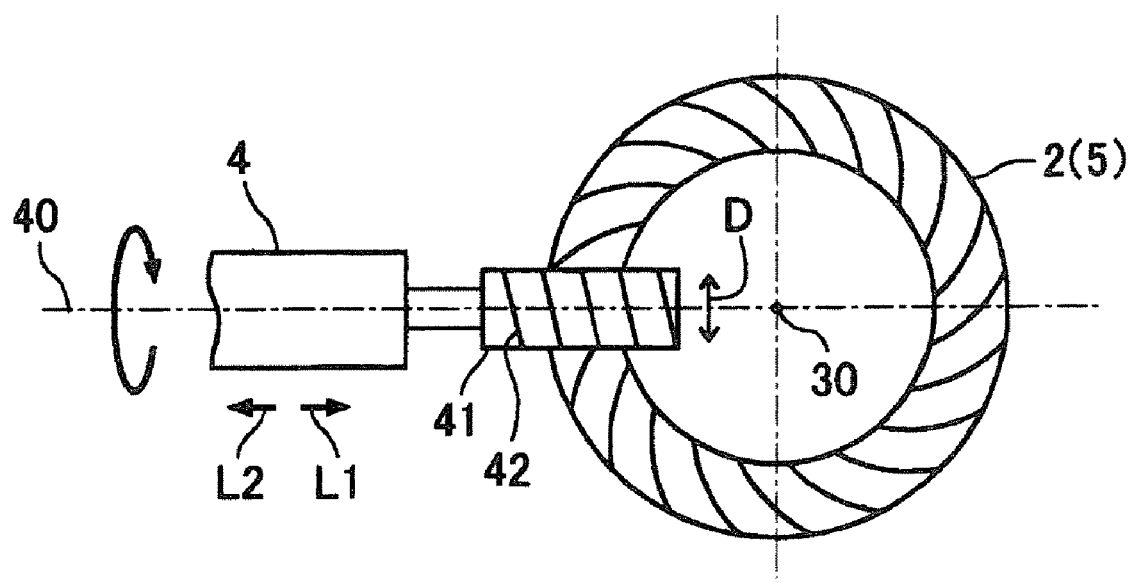
FIG. 3 illustrates a front view indicating states of the work piece and the hob, which are not offset.

According to the embodiment, on the basis of specifications relevant to the tooth portion of the face gear 5 that serves as a manufacturing target, as shown in FIG. 2, the offset amount OA is formed between the hob shaft axis 40 and the work piece shaft axis 30. FIG. 3 schematically illustrates a state in which the offset amount OA between the hob shaft axis 40 and the work piece shaft axis 30 is 0.

FIG. 1 and FIG. 2 illustrate an exemplary initial operation. In the initial operation, as illustrated in FIG. 1 and FIG. 2, the work piece 2 is coaxially mounted on the work piece shaft head 3 and the hob 41 is coaxially mount on the hob shaft head 4. At this point, as illustrated in FIG. 1, an outer periphery of the hob 41 faces a gear cutting area 20 of the work piece 2 in a state in which they are positioned apart from each other by an initial gap W. Therefore, the hob 41 can make contact immediately with the gear-cutting area 20 of the work piece 2. From this point, an improvement in production efficiency can be achieved. The initial gap W may varies depending on sizes such as that of the face gear. The initial gap W has been exemplified as between 1 and 5 millimeters, but need not be thus restricted.

In the initial operation, as illustrated in FIG. 1 and FIG. 2, as viewed in the direction indicated by the arrow X1 that serves as a direction parallel to that of the work piece shaft axis 30, the hob 41 transversely crosses a ring-shaped gear cutting area 20 of the work piece 2. In other words, as viewed in the direction indicated by the arrow X1, the ring-shaped gear cutting area 20 of the work piece 2 and the hob 41 overlap with one another and the ring-shaped gear cutting area 20 of the work piece 2 faces the cutting blade 42 of the hob 41 each other.

In this context, in the initial operation, as illustrated in FIG. 2, a distal end 41a in a lengthwise direction of the hob 41 is positioned in a radial direction that is more inward than an inner periphery 20i of the ring-shaped gear cutting area 20 of the work piece 2. In addition, a proximal end 41c in a lengthwise direction of the hob 41 is positioned in a radial direction that is more outward than an outer periphery 20p of the ring-shaped gear cutting area 20 of the work piece 2. In such circumstances, the cutting blades 42 of the hobs 41 can be used as many as possible. Further, in gear cutting operation, the extent of movement of the hob 41 along the axially lengthwise direction can be reduced (the direction indicated by the arrow L1 or L2). Therefore, there is no need to move reciprocally the hob 41 from the outer periphery 20p to the inner periphery 20i of the ring-shaped gear cutting area 20 of the work piece 2.

FIG. 4A through FIG. 4F illustrate respective stage of one rotation of the hob 41 around the hob shaft axis 40 thereof. In the initial operation described above, as illustrated in FIG. 4A, the hob 41 is first set at a preliminary position at which the distal end 42a of the cutting blade 42 of the hob 41 comes into contact with a surface of the gear cutting area 20 of the work piece 2, and thus the initial gap W mentioned above becomes 0. In such circumstances, it is preferable that a center cutting blade 42 in an axially lengthwise direction of the hob 41 is employed as a reference.

Figure 4A:
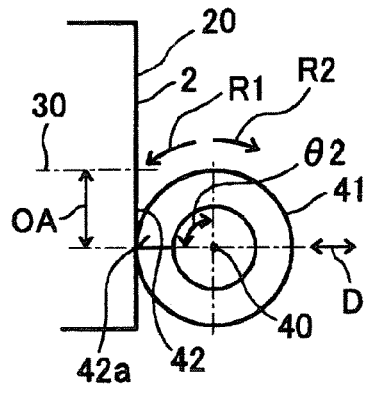
FIG. 4A illustrates a diagram indicating a state at which the work piece is processed by a rotation of the hob.
Figure 4B:
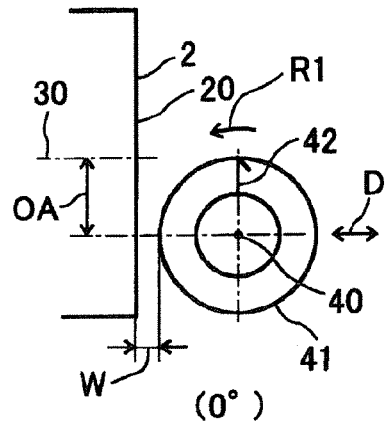
FIG. 4B illustrates a diagram indicating a state at which the work piece is processed by the rotation of the hob.

Moreover, the hob 41 is rotated around the hob shaft axis 40 in a direction that is the reverse (the direction indicated by arrow R2) of the rotational direction (the direction indicated by arrow R1), only by an angle of θ2 (90 degrees). Further, as illustrated in FIG. 4B, the hob 41 is positioned away from the work piece shaft axis 30 so as to substantially parallel thereto, separated by an initial gap W relative to a surface of the gear cutting area 20 of the work piece 2. Therefore, the initial gap W in a direction that is parallel to the work piece shaft axis 30 is equivalent to a gap between the hob 41 and a surface of the gear cutting area 20 of the work piece 2. A position B illustrated in FIG. 4 is equivalent to a position at which a rotational angle α of the hob 41 is 0 degrees, and thus, this position is defined as a reference position. In other words, position B that is illustrated in FIG. 4 is equivalent to a reference position at which the rotational angle α of the hob 41 is 0 degrees (start position of gear cutting).

A position C illustrated in FIG. 4 is equivalent to a position at which the rotational angle α of the hob 41 is 30 degrees. A position D illustrated in FIG. 4 is equivalent to a position at which the rotational angle α of the hob 41 is 150 degrees. A position E illustrated in FIG. 4 is equivalent to a position at which the rotational angle α of the hob 41 is 180 degrees. A position F illustrated in FIG. 4 is equivalent to a position at which the rotation angle α of the hob 41 is 360 degrees.

In FIG. 4, an interval 1 is equivalent to a range extending between the positions B and C, and the rotational angle α of the hob 41 is within a range of from 0 degrees to about 30 degrees. Similarly, an interval 2 is equivalent to a range extending between the positions C and D, and the rotational angle α of the hob 41 is within a range of from about 30 degrees to about 150 degrees; an interval 3 is equivalent to a range extending between the positions D and E, and the rotational angle α of the hob 41 is within a range of from about 150 degrees to about 180 degrees; and an interval 4 is equivalent to a range extending between the positions E and F, and the rotational angle α of the hob 41 is within a range of from about 180 degrees to about 360 degrees.

Figure 4C:
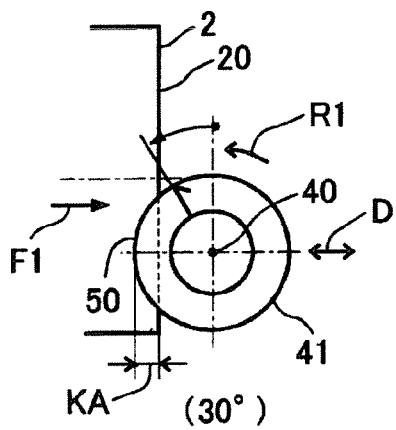
FIG. 4C illustrates a diagram indicating a state at which the work piece is processed by the rotation of the hob.

With regard to interval 1, as mentioned above, because this interval is equivalent to a range extending between the positions B and C, while the hob 41 is being rotated around the hob shaft axis 40 in a normal gear cutting direction (the unidirectional direction indicated by arrow R1), the work piece 2 is advanced by means of the work piece shaft head 3 in the direction indicated by the arrow F1 along the radial direction of the hob 41 (the direction indicated by arrow D). As a result, as illustrated in FIG. 4C, the hob 41 and the work piece 2 are pressed against each other, and then, the hob 41 cuts into a surface of the gear cutting area of the work piece 2. A depth of cut relative to the work piece 2 is referred to as KA (refer to FIG. 4C).

Figure 4D:
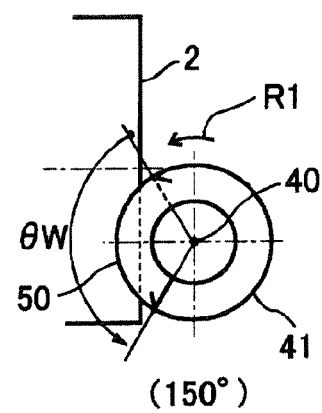
FIG. 4D illustrates a diagram indicating a state at which the work piece is processed by the rotation of the hob.
Figure 4E:
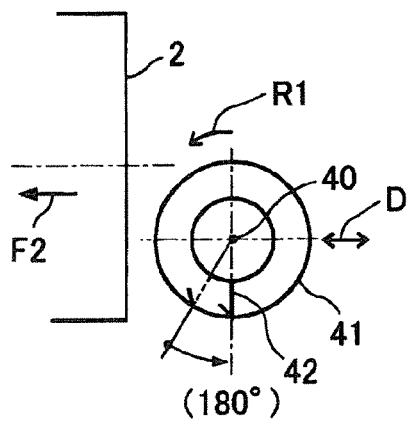
FIG. 4E illustrates a diagram indicating a state at which the work piece is processed by the rotation of the hob.

In such circumstances, the hob 41 is retracted along the hob shaft axis 40 in the direction indicated by arrow L2. In this manner, the hob 41 is retracted while it is being rotated around the hob shaft axis 40, and thus, the cutting blade 42 of the hob 41 performs a screw motion. At this time, as illustrated in FIG. 4C and FIG. 4D, during a period of one rotation around the hob shaft axis 40 of the hob 41, by virtue of a screw motion of the hob 41 that is equivalent to substantially a half rotation, or a rotation that is close thereto, a face-geared surface 50 is formed at the part of the gear cutting area 20 of the work piece 2.

A further description will now be provided. With regard to the interval 2 mentioned above, gear cutting is performed by means of the hob 41 relative to the gear cutting area 20 of the work piece 2. In other words, as mentioned above, in a state in which the work piece 2 is retained in a non-rotation state (an immobile state), while the hob 41 is rotated around the hob shaft axis 40 in a gear cutting direction (an unidirectional direction indicated by arrow R1), the hob 41 is retracted along the hob shaft axis 40 of the hob 41 in the direction indicated by arrow L2. In this manner, the cutting blade 42 of the hob 41 performs a screw motion. This can be said to be a motion that is equivalent to screw cutting by means of a screw tap. Therefore, as the hob 41, a hob free of outer periphery relief or a hob with a lesser degree of outer periphery relief, can be used, thus contributing to a reduction in costs.

During the course of one rotation around the hob shaft axis 40 of the hob 41, by means of substantially a half rotation, or an approximate half rotation, a face-geared surface 50 is formed at a part of the gear cutting area 20 of the work piece 2. In the face-geared surface forming operation described above, by virtue of the substantially half rotation of the hob 41, the hob 41 moves along the hob shaft axis 40 in the direction indicated by arrow L2. This is an axial movement of the hob 41. With reference to FIG. 4D, a rotational angle at which the hob 41 cuts into the work piece 21 is defined as θW. According to FIG. 4D, θW remains within a half rotation during a period of one rotation of the hob 41, that is, within 180 degrees.

As for interval 3, since this interval is equivalent to the range of positions between D and E, during the course of one rotation around the hob shaft axis 40 of the hob 41, the rotational angle θW of the hob 41 is between about 150 degrees and about 180 degrees, the work piece 2 is retracted from the work piece shaft head 3 along the radial direction of the hob 41 (the direction indicated by arrow D), in other words, in a direction indicated by arrow F2, and thus the hob 41 and the work piece 2 are positioned away from each other. At this time also, the hob 41 rotates in the gear cutting direction (the direction indicated by arrow R1).

As for interval 4, because this interval is equivalent to the range of positions between E and F, during the course of the last half rotation of the hob 41 around the hob shaft axis 40 thereof (180 degrees to 360 degrees), in order to recompense for the axial movement of the hob 41 mentioned above (movement of the hob 41 along the direction indicated by the arrow L2), movement that had occurred due to the first rotation of the hob 41 (zero degree to 180 degrees) in the face-geared surface forming operation described above, the hob 41 is advanced along the hob shaft axis 40 in the direction indicated by arrow L1. In this manner, in the axially lengthwise direction of the hob 41, a positional relationship between the hob 41 and the work piece 2 is restored to their initial position.

Further, in the interval 4, in order to prepare for the next machining step, the work piece 2 is rotated by a slight amount around the work piece shaft axis 30 to a minimal degree in a work piece feed direction (the direction indicated by arrow EA). A feed is thereby provided to the work piece 2. In addition, a ratio of the number of teeth between the hob 41 and the work piece 2, and a degree of rotation (feeding) appropriate to the extent of feed of the work piece 2 are provided to the hob 41. Alternatively, the feed of the hob 41 may be replaced with the axial movement along the hob shaft axis 40 of the hob 41. In this manner, the initial position of the hob 41 can always be fixed, and similar machining can be performed even if a hob having a cutting blade within entire periphery thereof is not used.

According to the present invention, the operations illustrated in FIG. 4B to FIG. 4F, and described above, are repeatedly performed sequentially. In other words, during a period when one rotation of the hob 41 around the hob shaft axis 40 is taking place, there are sequentially performed: a cutting motion of the hob 41; a screw motion of the hob 41 for gear cutting; a spacing motion between the hob 41 and the work piece 2 caused by retraction of the work piece 2; and a motion of correcting the axial position of the cutting blade 42 of the hob 41 so as to prepare for the next machining.

In the present embodiment, the gear cutting process of the work piece 2 is finished by completing one rotation of the work piece 2 around the work piece shaft axis 30 of the work piece 2, that is, when the gear cutting area 20 of the work piece 2 is rotated by 360 degrees around the work piece shaft axis 30, the gear cutting process is finished. The work piece 2 is thereby manufactured as the face gear 5 having a helical face-geared surface 50.

According to the present embodiment as mentioned above, at an initial position, the hob 41 faces the work piece 2 with a distance. Therefore, since the hob 41 can rapidly be put into contact with the work piece 2, the entire processing time can be advantageously shortened, and, a face gear 5 can according be efficiently manufactured. For this face gear 5, a worm (screw-shaped gear) is used as a pinion (a counterpart gear meshing with the face gear 5).

Therefore, according to the present embodiment, a gear combination of the face gear 5 and the worm can be formed. A combination of the face gear 5 and the work piece is highly efficient in comparison with that of a worm gear and a worm wheel, and a highly-efficient, inexpensive reduction gear can be advantageously provided.

Further, according to the present embodiment, in the face-geared surface forming operation, the face-geared surface 50 is formed by the less than one rotation of the hob 41 around the hob shaft axis 40. Then, during the remaining rotation of the hob 41, the work piece 2 is retracted so that the hob 41 and the work piece 2 are positioned away from each other. The idling time of the hob 41 is thereby shortened, and thus, the entire processing time can be shortened.

In the present embodiment, in the face-geared surface forming operation and the retracting operation mentioned above, the hob 41 may be continuously rotated around the hob shaft axis 40 only in the gear cutting direction (the direction indicated by arrow R1). In other words, in the face-geared surface forming operation and the retracting operation mentioned above, the hob 41 does not need to be rotated toward the direction (the direction indicated by arrow 2) that is opposite to the gear cutting direction (the direction indicated by arrow R1). Therefore, this process can be the forming method of continuous gear cutting of the face gear 5.

In the present embodiment, machining for cutting out a tooth is performed at the interval 2. At the interval 2, the work piece 2 is still in a non-rotational state, and only the hob 41 performs a screw motion along the thread direction of the hob 41. This motion is equivalent to screw cutting by means of a screw tap. Therefore, in a similar way to the case of the screw tap, for the hob 41 used in the gear cutting of the face gear 5, a hob can be used that is free of an outer periphery relief, or a hob with lesser degree of outer periphery relief. This fact is advantageous in facilitating hob manufacturing. A hob having an outer periphery relief may of course be used.

Figure 4F:
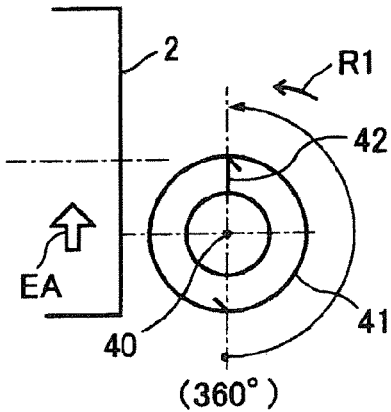
FIG. 4F illustrates a diagram indicating a state at which the work piece is processed by the rotation of the hob.

In the present embodiment, in the operation mentioned above, the work piece 2 is advanced by means of the work piece shaft head 3 in a forward direction (the direction indicated by arrow F1), or is retracted in a backward direction (the direction indicated by arrow F2). However, in areas illustrated in FIG. 4B to FIG. 4E, the work piece 2 does not basically rotate around the work piece shaft axis 30. However, as shown in FIG. 4F, after gear cutting has been completed, the work piece 2 is rotated for the purpose of feeding by an amount of feeding in the feed direction (the direction indicated by arrow EA). In this manner, from among the gear cutting areas 20 of the work piece 2, a new portion becomes so as to face the hob 41.

According to the present embodiment, at the interval 2, while the hob 41 is being rotated around the hob shaft axis 40 in the gear cutting direction (the unidirectional direction indicated by arrow R1), the hob 41 is retracted along the hob shaft axis 40 in the direction indicated by arrow L2. However, the invention is not limited thereto, and at the interval 2, while the hob 41 is being rotated around the hob shaft axis 40 in the gear cutting direction (the unidirectional direction indicated by arrow R1), instead of moving the hob 41 in such a way that the hob 41 is retracted relatively along the hob shaft axis 40 in the direction indicated by arrow L2, the work piece 2 may be moved toward the hob 41.

In the present embodiment described above, during the interval 3, the work piece 2 is retracted along the radial direction of the hob 41 (direction indicated by the arrow D), in other words, in the direction indicated by arrow F2 by means of the work piece shaft head 3, and the hob 41 and the work piece 2 are thus positioned away from each other. However, the invention is not limited thereto, and instead of moving the hob 41, the work piece 2 may be moved so as to relatively retract the work piece 2 by means of the work piece shaft head 3 in the direction indicated by arrow F2.

In the present embodiment, since the precision of the tooth portion of the face gear 5 can be guaranteed, lapping and polishing by means of an actual gear is not necessary. Further, while a right screw hob has been used in the present embodiment, a left screw hob may also be used. In such a case, the axial direction movement of the hob at each interval needs to be inverted from that of the present embodiment.

In the present embodiment, on the basis of the discussions relating to a face gear 5 that serves as a manufacturing target, as illustrated in FIG. 2, an offset amount OA is defined between the hob shaft axis 40 and the work piece shaft axis 30. However, the invention is not limited thereto, and as illustrated in FIG. 3, an offset amount OA between the hob shaft axis 40 and the work piece shaft axis 30 may be set to 0.

According to the present embodiment, on the face-geared surface 50, a cross section of a tooth portion may be, or may not be, taken along an involute curve.

While in the face gear 5, manufactured in the embodiment described above, a worm (screw-shaped gear) is used as a pinion (counterpart gear meshing with the face gear 5), the invention is not limited thereto. A helical gear may serve as a counterpart gear.

Second Embodiment

FIG. 6 illustrates a second embodiment of the present invention. The second embodiment is provided as an example in which the face gear is applied to a molding die 70 (member) for resin-molding the face gear. The present embodiment basically has the same configuration and the same advantageous effect as that in the first embodiment. Therefore, FIG. 1 to FIG. 5 can each be applied mutatis mutandis. However, according to the present embodiment, the work piece 2 is made of an electrode forming material such as graphite or a copper alloy.

Figure 6A:
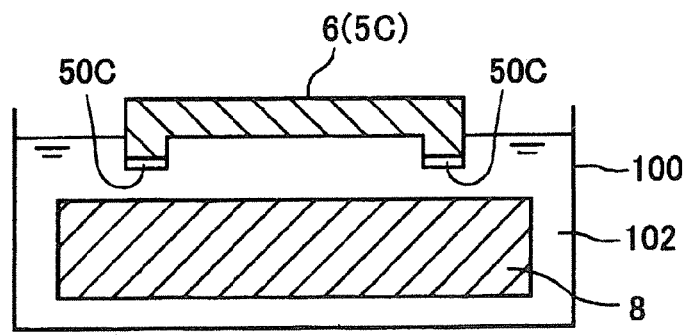
FIG. 6A illustrates a diagram indicating a process of producing a faced-gear, according to the second embodiment.
Figure 6B:
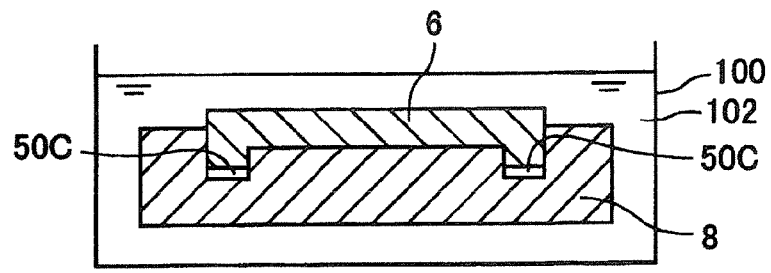
FIG. 6B illustrates a diagram indicating a process of producing a faced-gear, according to the second embodiment.
Figure 6C:
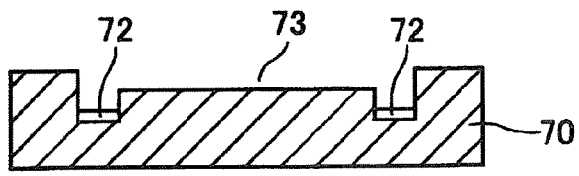
FIG. 6C illustrates a diagram indicating a process of producing a faced-gear, according to the second embodiment.

In the present embodiment, by means of an operation similar to that in the first embodiment, a face gear 5C is manufactured for which the aforementioned electrode forming material is used as a base material. Further, as shown in FIG. 6A and FIG. 6B, a face gear 5C is employed as an electrode 6 for electrical discharge machining. Specifically, the electrode 6 for electrical discharge machining and a die member 8 are immersed in a metal working fluid 102 that has electrical insulation properties, and that is contained in a metal working fluid tank 100. In this state, the electrode 6 and the die member 8 are made to approach one another, and are made to face each other. Then, an electric discharge is generated between the electrode 6 and the die member 8, and, a helical face-geared surface 50C that is formed on the electrode 6 is then transferred on the die member 8. In this manner, as shown in FIG. 6C, the mold die 70 is formed having a cavity 73 with a transfered face-geared surface 72 obtained by copying the face-geared surface 50C thereon.

Figure 6D:
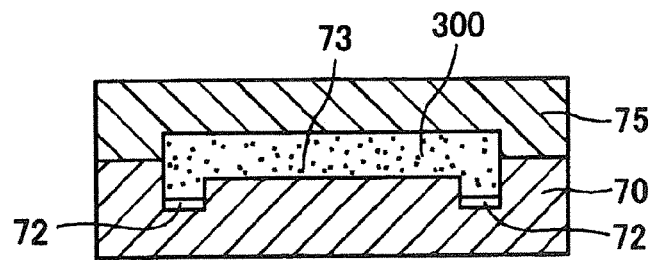
FIG. 6D illustrates a diagram indicating a process of producing a faced-gear, according to the second embodiment.
Figure 6E:
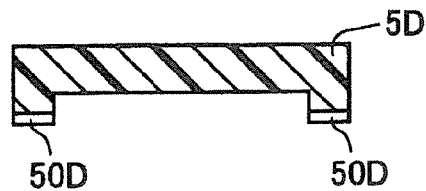
FIG. 6E illustrates a diagram indicating a process of producing a faced-gear, according to the second embodiment.

The mold die 70 mentioned above is employed as a mold die for resin ejection molding. In other words, as illustrated in FIG. 6D, the mold die 70 and a counterpart die 75 are die-clamped. Then, a resin material 300 that has fluidity is ejection-molded in a cavity 73 of the mold die 70, and then, the resin material 300 is solidified. By die-opening the counterpart die 75 and the mold die 70, a face gear 5D that serves as a resin molded component can be obtained, the face gear 5D which has a face-geared surface 50D onto which a transfered face-geared surface 72 of the mold die 70 has been retransfered. For this face gear 5D, a worm is used as a pinion (a counterpart gear meshing with the face gear 5).

Third Embodiment

Figure 7:
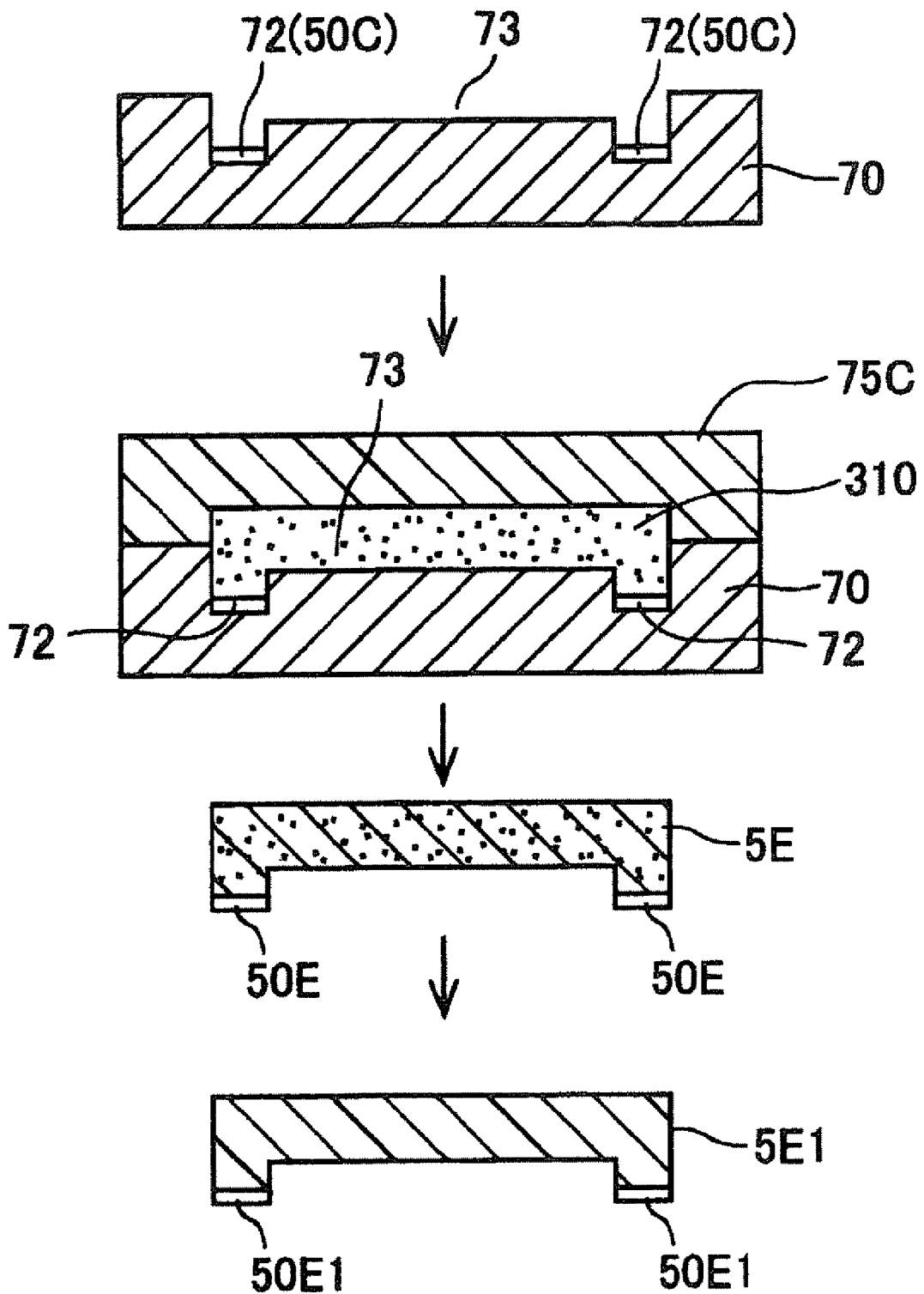
FIG. 7 illustrates a diagram indicating a process of producing a faced-gear, according to the third embodiment.

FIG. 7 illustrates a third embodiment. In the present embodiment, the mold die 70 is used as a mold die for sintering molding, the mold die having the cavity 73 with a transfered face-geared surface 72 that is made by copying the helical face-geared surface 50C as mentioned above. In this case, the cavity 73 of the mold die 70 is filled with a metal powder material 310. The metal powder material 310 is pressurized by means of a counterpart die 75C and the mold die 70. In this manner, a pressurized powdered member 5E having a face-geared surface 50E, onto which a transfered face-geared surface 72 of the mold die 70 has been retransfered, is produced. A face gear 5E1 that serves as a sintered article that has the face-geared surface 50E1 can be obtained by heating and retaining the pressurized powdered member 5E under a sintering temperature environment. For this face gear 5E1, a worm is used as a pinion (a counterpart gear meshing with the face gear 5).

Fourth Embodiment

Figure 8:
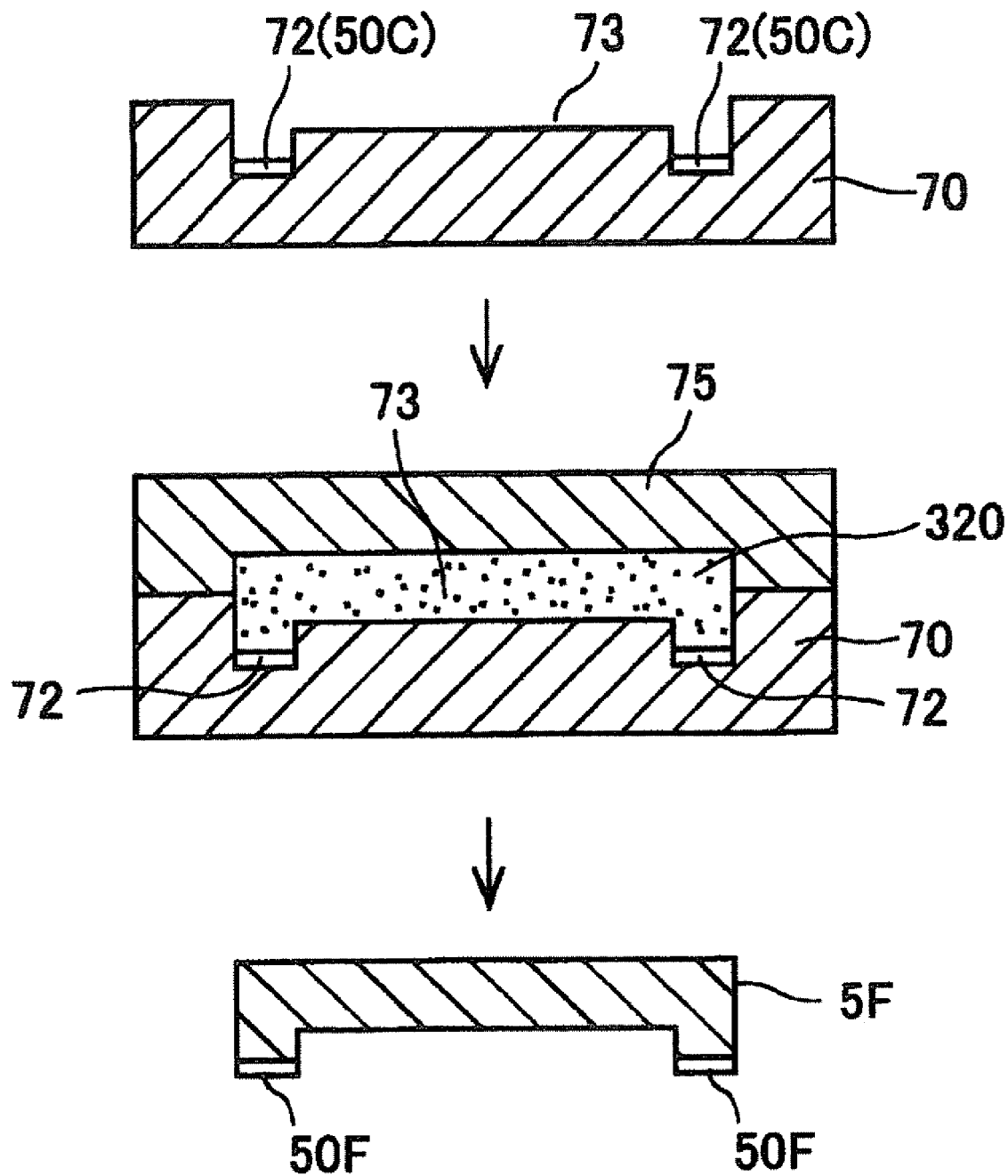
FIG. 8 illustrates a diagram indicating a process of producing a faced-gear, according to the fourth embodiment.

FIG. 8 illustrates a fourth embodiment of the invention. In the present embodiment, the aforementioned mold die 70 having the cavity 73 with the transfered face-geared surface 72 on which the helical face-geared surface 50C has been transfered is employed as a mold die for forging molding. In this case, by employing the counter die 75, a lump of metal 320 is pressurized and plastically deformed by means of the cavity 73 of the mold die 70, and thus, a cast product is formed. In this manner, a face gear 5F that serves as a cast product is molded, a face gear that has a face-geared surface 50F onto which a transfered face-geared surface 72 of the mold die 70 has been retransfered.

Fifth Embodiment

Figure 9:
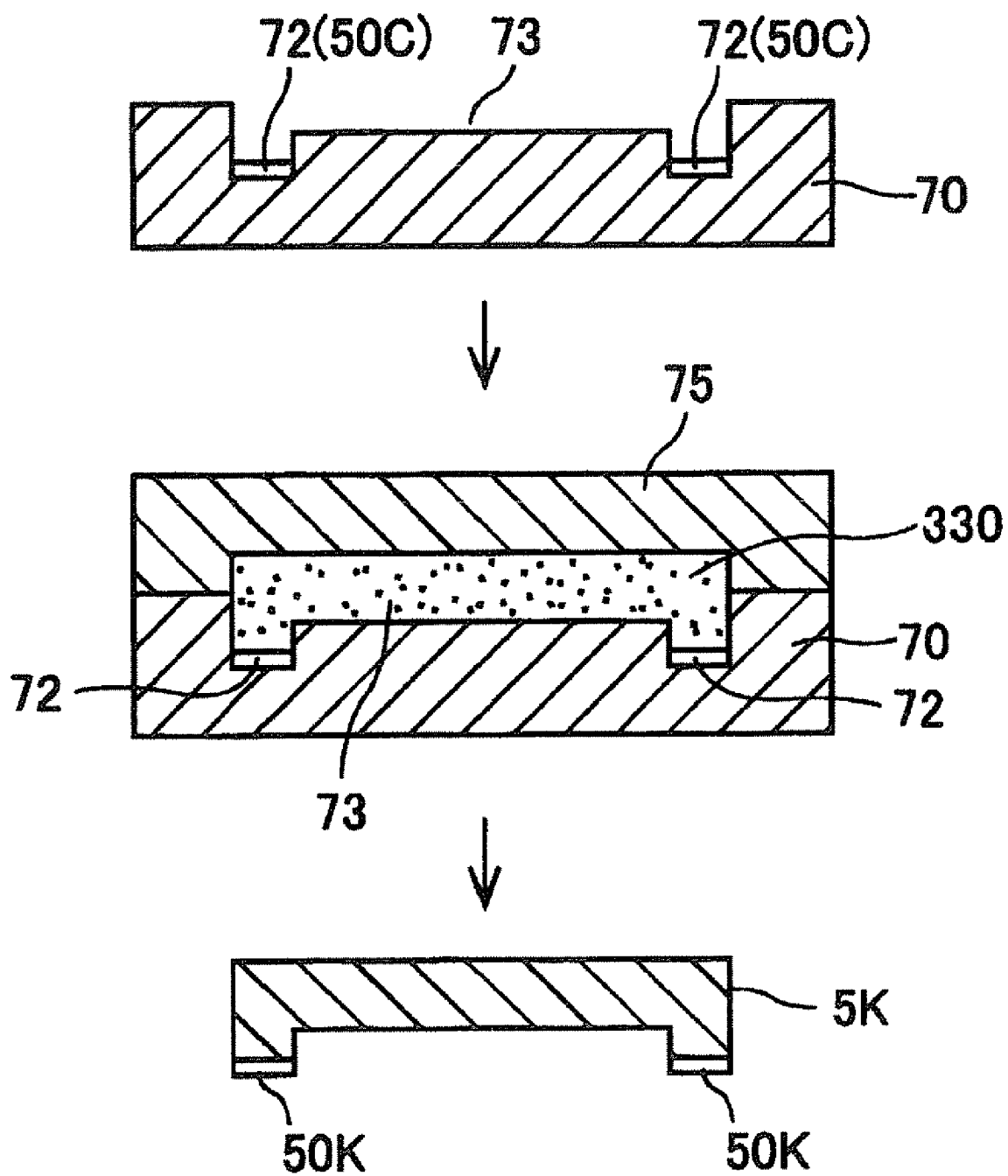
FIG. 9 illustrates a diagram indicating a process of producing a faced-gear, according to the fifth embodiment.

FIG. 9 illustrates a fifth embodiment. In the present embodiment, the mold die 70 is employed as a mold die for forging molding, the mold die having the cavity 73 with a transfered face-geared surface 72 onto which the aforementioned face-geared surface 50C has been transfered. In a state in which the counterpart die 75 and the mold 70 are die-clamped, a molten metal 330 is poured and coagulated by means of the cavity 73 of the mold die 70, and, thus, a forged product is formed. In this manner, a face gear 5K that serves as a forged product is molded, a face gear that has a face-geared surface 50K onto which the transfered face-geared surface 72 of the mold die 70 has been retransfered.

Sixth Embodiment

FIG. 10 illustrates a sixth embodiment 6. The present embodiment basically attains a common construction and a common advantageous effect. Therefore, FIG. 1 to FIG. 5 each can be applied mutatis mutandis. However, it should be noted that, according to the present embodiment, the work piece 2 is formed of an electrode forming material for electrochemical machining.

Figure 10A:
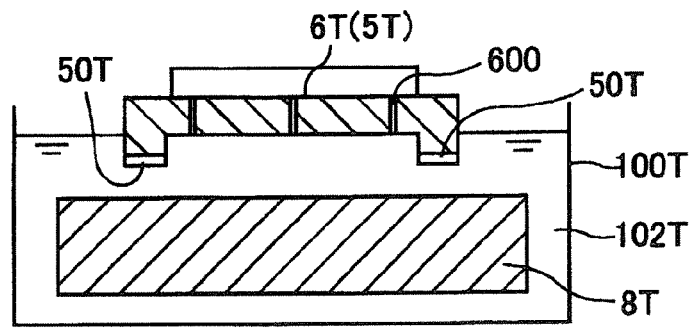
FIG. 10A illustrates a diagram indicating a process of producing a faced-gear, according to the sixth embodiment.
Figure 10B:
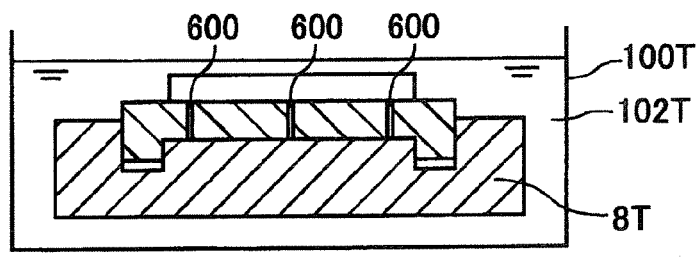
FIG. 10B illustrates a diagram indicating a process of producing a faced-gear, according to the sixth embodiment.
Figure 10C:
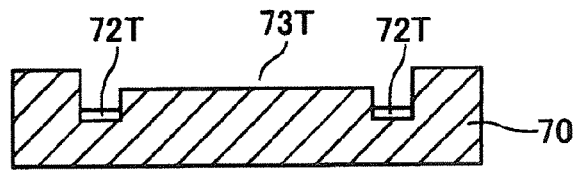
FIG. 10C illustrates a diagram indicating a process of producing a faced-gear, according to the sixth embodiment.
Figure 10D:
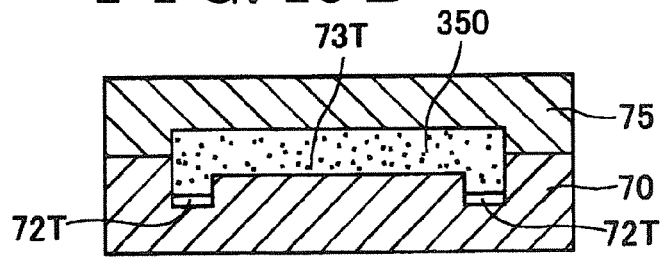
FIG. 10D illustrates a diagram indicating a process of producing a faced-gear, according to the sixth embodiment.
Figure 10E:
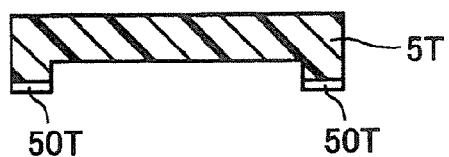
FIG. 10E illustrates a diagram indicating a process of producing a faced-gear, according to the sixth embodiment.
Figure 11A:
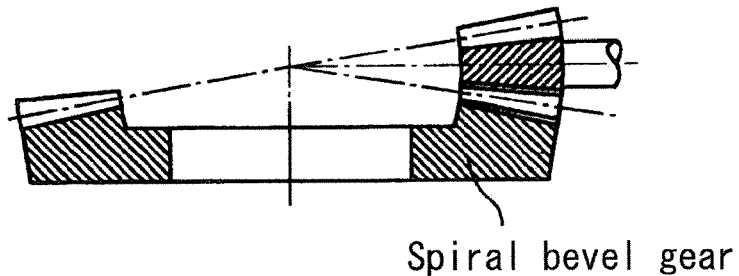
FIG. 11A illustrates a cross section indicating a spiral bevel gear meshing with a pinion related to a prior art.
Figure 11B:
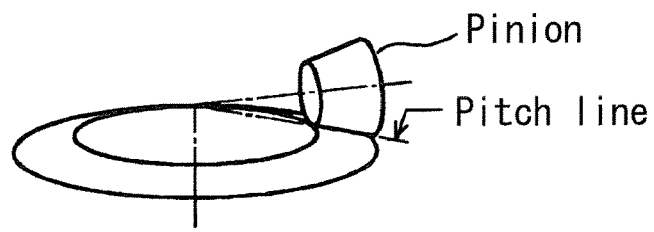
FIG. 11B illustrates a perspective view indicating the spiral bevel gear meshing with the pinion related to the prior art.
Figure 12A:
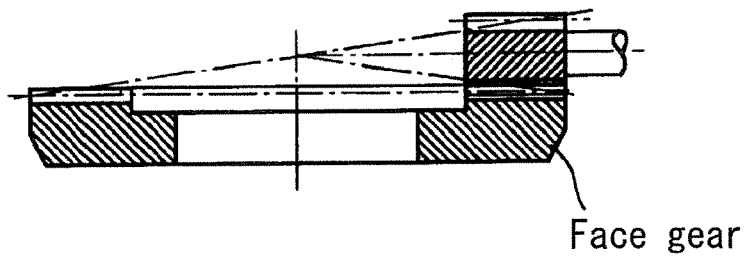
FIG. 12A illustrates a cross section indicating a face gear meshing with a pinion related to a prior art.
Figure 12B:
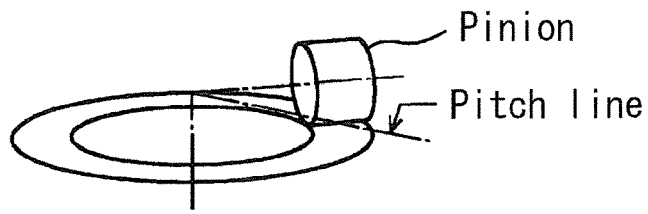
FIG. 12B illustrates a perspective view indicating the face gear meshing with the pinion related to the prior art.

In the present embodiment, a face gear 5T made of an electrode forming material for electrochemical machining is formed by means of an operation similar to that of the first embodiment. This face gear 5T is employed as an electrode 6T for electrochemical machining. In other words, as illustrated in FIG. 10A and FIG. 10B, the electrochemical machining electrode 6T and the die member 8T are immersed in an electrolyte solution 102T contained in a tank 100T. With the electrochemical machining electrode 6T being a cathode (negative pole) and with the die member 8T being an anode (positive pole), the electrode 6T and the die member 8T are set at an electrochemical machining device while they are opposite to each other. In this state, while power is being supplied between the cathode (negative pole) and the anode (positive pole), the electrode 6T is fed to the die member 8T. Then, the electrolyte solution is ejected from an electrolyte solution ejection pore 600, which has been formed on the electrode 6T, into a gap between the electrode 6T and the die member 8T. A surface part of the die member 8T that serves as an anode is chemically eluted thereby. As a result, a face-geared surface 59T that is formed on the electrode 6T is transfered to the surface part of the die member 8T. In such a manner, as illustrated in FIG. 10C, a mold die 70 is formed which has a cavity 73T with a transfered face-geared surface 72T onto which a face-geared surface 50T of the electrode 6T has been transfered.

The mold die 70 described above is employed as a mold die for resin ejection molding. In other words, the mold die 70 and the counterpart die 75 are die-clamped. Then, a resin material 350 that has fluidity is ejection-molded within a cavity 73T of the mold die 70, and, the resin material 350 is then solidified. By die-opening the mold die 70, a face gear 5T that serves as a resin molded component can be obtained, a face gear that has a face-geared surface 50T onto which a transfered face-geared surface 72T of the mold die 70 has been transfered.

The present invention is not limited to the embodiments that are described above, and that are illustrated in the accompanying drawings, and can also be carried out by appropriate modification without departing from the spirit of the invention.

INDUSTRIAL APPLICABILITY

According to the present invention, a face gear, an electric discharging electrode, or an electrolysis electrode, for example, can be exemplified as members that can be utilized according to a method for manufacturing the member having a face-geared surface.

According to the present embodiment as mentioned above, at an initial position, the hob faces the work piece with a distance. Therefore, since the hob can rapidly be put into contact with the work piece, the entire processing time can be advantageously shortened, and, a face gear can according be efficiently manufactured.

Further, according to the present embodiment, in the face-geared surface forming operation, the face-geared surface is formed by the less than one rotation (360 degrees) of the hob around the longitudinal axis thereof. Then, during the remaining rotation of the hob, the work piece is retracted so that the hob and the work piece are positioned away from each other. The idling time of the hob is thereby shortened, and thus, the entire processing time can be shortened.

According to the present embodiment, the mold die with the cavity having the transfered face-geared surface is produced, and by means of such mold die, the face gear can be mass-produced.

According to the present embodiment, the transfered face-geared surface of the mold die is further transfered to the molding material existing within the mold die. Thus, the face gear having the face-geared surface can be mass produced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A method of producing a member with a face-geared surface comprising the steps of:
   (a) an initial process preparing a work piece and a hob, the work piece having an area to be geared, the hob having a blade, the hob being brought into an axial movement when rotated through an angle of 360 degrees about its longitudinal axis, the initial process bringing the work piece to oppose the hob with a distance;

(b) a geared surface forming process forming a geared surface on a part of the area by rotating the hob about its longitudinal axis in one direction through an angle of less than 360 degrees after an establishment of a mutual engagement between the hob and the work piece which results from moving at least one of the hob and the work piece in a radial direction of the hob;

(c) a retracting process retracting the at least one of the hob and the work piece in the radial direction of the hob to establish a separation of the hob from the work piece before the hob completes its 360 degree rotation about its longitudinal axis, the retracting process retracting the hob in its longitudinal direction through a distance which is equal to an axial movement amount of the hob resulting from rotating the hob; and (d) a repeating process repeating the geared surface forming process and the retracting process to produce a full face-geared surface on the area of the work piece.

2. The method as set forth in claim 1, wherein the member having the faced-gear surface is used as one of a face gear, an electrode for electrochemical machining, and an electrode for electro-discharge machining.

3. The method as set forth in claim 1, wherein during the geared-surface forming process the work piece is being made immovable.

4. The method as set forth in claim 1, wherein during the retracting process the work piece is rotated through an angle about its longitudinal axis to move the work.

5. The method as set forth in claim 1, wherein an offset is defined between the longitudinal axis of the work piece and the longitudinal axis of the hob.

6. The method as set forth is claim 1 further comprising the steps of:

employing process employing the member with the gear-faced surface which is produced by the method of claim as an electrode:

preparing process preparing a blank:

tranfering process transferring the profile of the geared surface of the electrode on to the blank to form a die member whose cavity is formed with the transferred gear-surfaced profile.

7. The method as set forth in claim 6, the cavity of the die member is filled with molding member to produce a member with a re-transferred profile of the geared surface of the electrode.

\* \* \* \* \*